US007204421B2

(12) United States Patent
Austin (10) Patent No.: US 7,204,421 B2
(45) Date of Patent: Apr. 17, 2007

(54) METHOD OF IDENTIFYING AND AUTHENTICATING PRODUCTS USING AN IDENTIFICATION PATTERN AND A BAR CODE READER

(75) Inventor: Timothy B. Austin, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 287 days.

(21) Appl. No.: 10/974,644

(22) Filed: Oct. 27, 2004

(65) Prior Publication Data

US 2006/0086791 A1    Apr. 27, 2006

(51) Int. Cl.
*G06K 7/10* (2006.01)
(52) U.S. Cl. ................... 235/462.01; 235/449
(58) Field of Classification Search ..............................
235/462.01–462.25, 491, 380, 456, 454,
235/449; 436/518, 523; 705/27
See application file for complete search history.

(56) References Cited

U.S. PATENT DOCUMENTS

| 5,329,107 | A  | * | 7/1994  | Priddy et al.   | 235/494 |
|-----------|----|---|---------|-----------------|---------|
| 5,484,999 | A  | * | 1/1996  | Priddy et al.   | 235/494 |
| 6,601,772 | B1 | * | 8/2003  | Rubin et al.    | 235/494 |
| 6,830,197 | B2 | * | 12/2004 | Rubin et al.    | 235/494 |
| 7,044,376 | B2 | * | 5/2006  | Nelson et al.   | 235/454 |
| 2003/0028451 | A1 | * | 2/2003 | Ananian         | 705/27 |
| 2003/0121978 | A1 | * | 7/2003 | Rubin et al.    | 235/462.1 |
| 2004/0096911 | A1 | * | 5/2004 | Siniaguine et al. | 435/7.1 |
| 2004/0112962 | A1 | * | 6/2004 | Farrall et al.  | 235/462.01 |
| 2005/0018013 | A1 | * | 1/2005 | Nelson et al.   | 347/44 |
| 2006/0071079 | A1 | * | 4/2006 | Hepworth et al. | 235/462.08 |

OTHER PUBLICATIONS

Flyer published by Microtrace, LLC. and printout from website www.microtaggant.com regarding Microtrace's Microtaggant brand identification particles. Copyright © 2004 Microtrace, LLC. 1 pg. (front and back side).

* cited by examiner

*Primary Examiner*—Thien M. Le
(74) *Attorney, Agent, or Firm*—Tarolli, Sundheim, Covell & Tummino LLP (57) ABSTRACT

A method for identifying/authenticating a product. The method includes providing a substrate coupled to the product that includes an identification pattern within a region of interest and imaging the region of interest of the substrate to identify identification particles of the identification pattern. For the identified identification particles in the region of interest, calculating a mathematical value representative of a position of the particle relative to at least one other identification particle and converting the mathematical values of the identified identification particles into an identification value representative of the identified identification particles. The identification value is compared with stored identification values in a database to identify/authenticate the product. Alternately, or in addition, the identification value is compared to an identification value decoded from a bar code imprinted on the product.

40 Claims, 5 Drawing Sheets

METHOD OF IDENTIFYING AND AUTHENTICATING PRODUCTS USING AN IDENTIFICATION PATTERN AND A BAR CODE READER

FIELD OF THE INVENTION

The present invention relates to a method of identifying and authenticating a product using a bar code reader and, more particularly, to a method of embedding a unique identification pattern in the substrate of a tamper-resistant seal or cap of a product and imaging the identification pattern to authenticate and/or track the product as it travels through it distribution system.

BACKGROUND OF THE INVENTION

There is an increasing concern over counterfeit over-the-counter and prescription drugs entering the U.S. market. This concern is exacerbated because of the ready availability of lower cost prescription drugs from pharmacies and drug stores in foreign countries such as Canada.

Because of governmental regulations and/or to prevent unauthorized tampering, many prescription and over-the-counter drugs are packaged in containers using tamper-resistant seals. The consumer purchasing a drug product must break or destroy the tamper-resistant seal in order to open the container and access the product. While such tamper-resistant seals effectively thwart tampering, sophisticated counterfeit drug manufacturers may manufacture containers that include a tamper-resistant seal. Thus, tamper-resistant seals do not adequately address the issue of counterfeit drugs.

There is a need to provide an effective identification and authentication procedure to insure that a purchased drug product is authentic, beyond the use of a tamper-resistant seal on the product container. There is also a need to provide an effective method to track drug products as they move through various stages in the distribution system. Finally, there is a need to accomplish the foregoing objectives using readily available technology and equipment.

SUMMARY OF THE INVENTION

The present invention is directed to a method of identifying or authenticating a product by applying a unique identification pattern to the product, product container or product packaging, such as the product's tamper-resistant seal and authenticating the product by using a bar code reader to read the identification pattern.

In one embodiment, the unique identification pattern is a pattern of spaced apart particles embedded in the substrate of a tamper-resistant seal. A region of interest of the seal which includes the identification pattern is imaged by a bar code reader and the identification particles within the region of interest are identified. A perimeter of the identification particles is identified and a geometric center of an area defined by the perimeter is determined. Given the geometric center of the identification pattern perimeter, a polar vector (distance and angle) for each identification particle in the region of interest is determined. The distance magnitudes of the polar vectors are scaled or normalized based on the maximum polar vector distance. Angles between radially adjacent particles are computed. The combination of angular differences and scaled distances comprise a unique electronic signature corresponding to the identification pattern for the product.

The electronic signature is stored in a database for future authentication of the product as it moves through its distribution system. Additionally, the electronic signature may be affixed to the product by, for example, incorporating the electronic signature into the product's bar code which would be imprinted on a label of the product or the product packaging. Other methods of affixing the electronic signature to the product would be to incorporate the electronic signature into an RFID (radio frequency identification) tag affixed to the product.

At any point or node in the distribution system, the product's authenticity can be verified by imaging the identification pattern and obtaining the electronic signature. This may be done either by: 1) comparing the identification pattern electronic signature with an electronic signature incorporated into the product bar code or RFID tag; or 2) by comparing the identification electronic signature with electronic signatures stored in the central database. If the identification pattern signature matches the bar code electronic signature or RFID electronic signature, the product is authentic. Alternately, if the identification pattern signature matches one of the stored signatures in the database, the product is authentic.

Tracking of the product through the distribution system is also facilitated since when a product is authenticated at a node, the information regarding the location of the node and the time and date of authentication would be obtained and transmitted to a central database.

Because the identification pattern signature utilizes differences in angles (between radially adjacent particles) and scaled distances (based on the greatest distance between the center and the furthest particle), the identification pattern electronic signature may be determined regardless of the rotational angle of the bar code reader with respect to the identification pattern, the distance between the reader and the label or a degree of magnification used by the reader to image the identification pattern. When the ultimate consumer opens the product, the tamperproof seal is destroyed preventing its reuse for any counterfeit products.

These and other objects, advantages, and features of the exemplary embodiment of the invention are described in detail in conjunction with the accompanying drawings.

DETAILED DESCRIPTION

Figures 1, 1A:
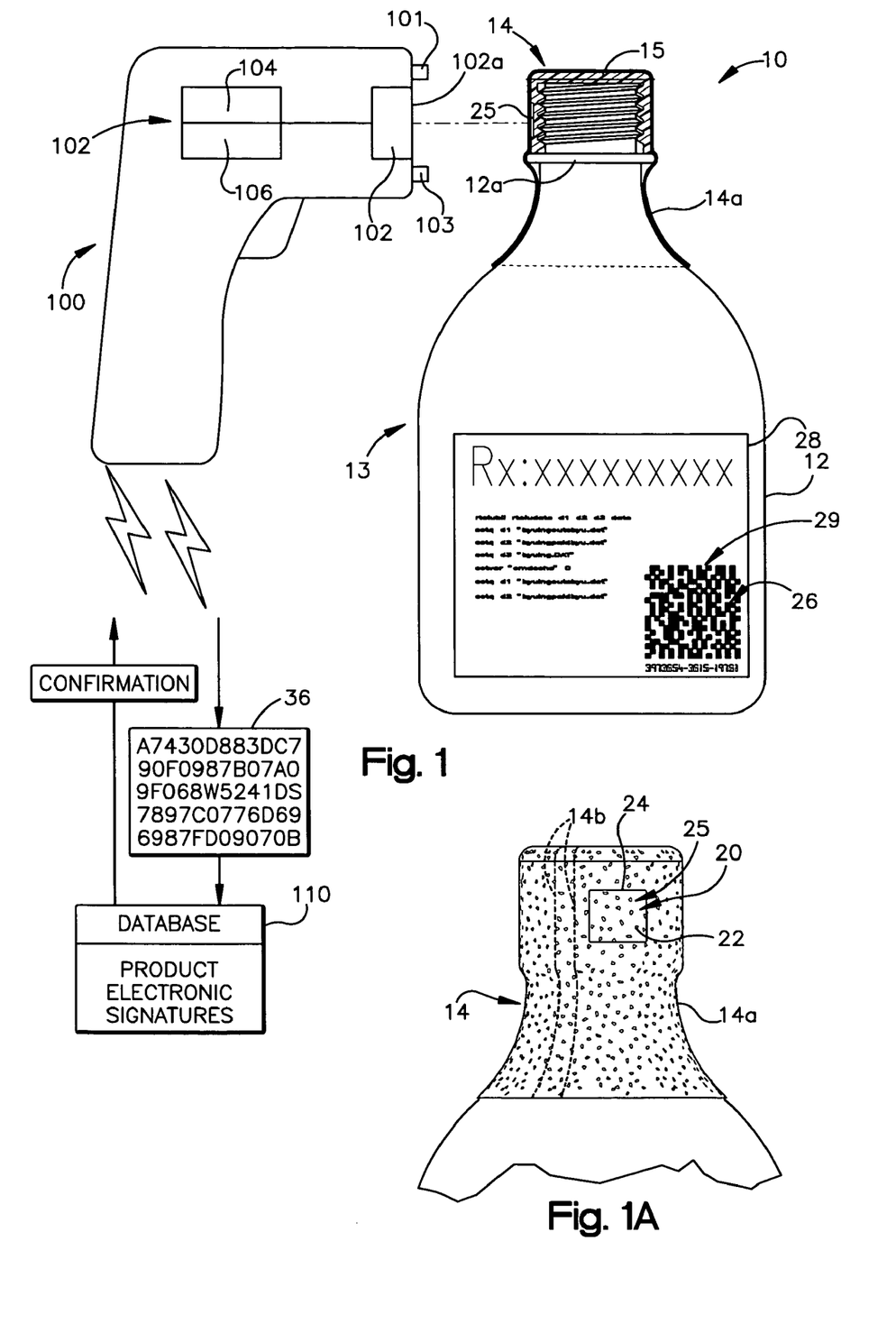
FIG. 1 is a schematic representation of an authentication/identification system of the present invention including a container having a wrapped tamper-resistant seal, the wrapped seal including a border and a set of identification particles within the border.
FIG. 1A is a schematic elevation view of the wrapped seal of FIG. 1.
Figure 2:
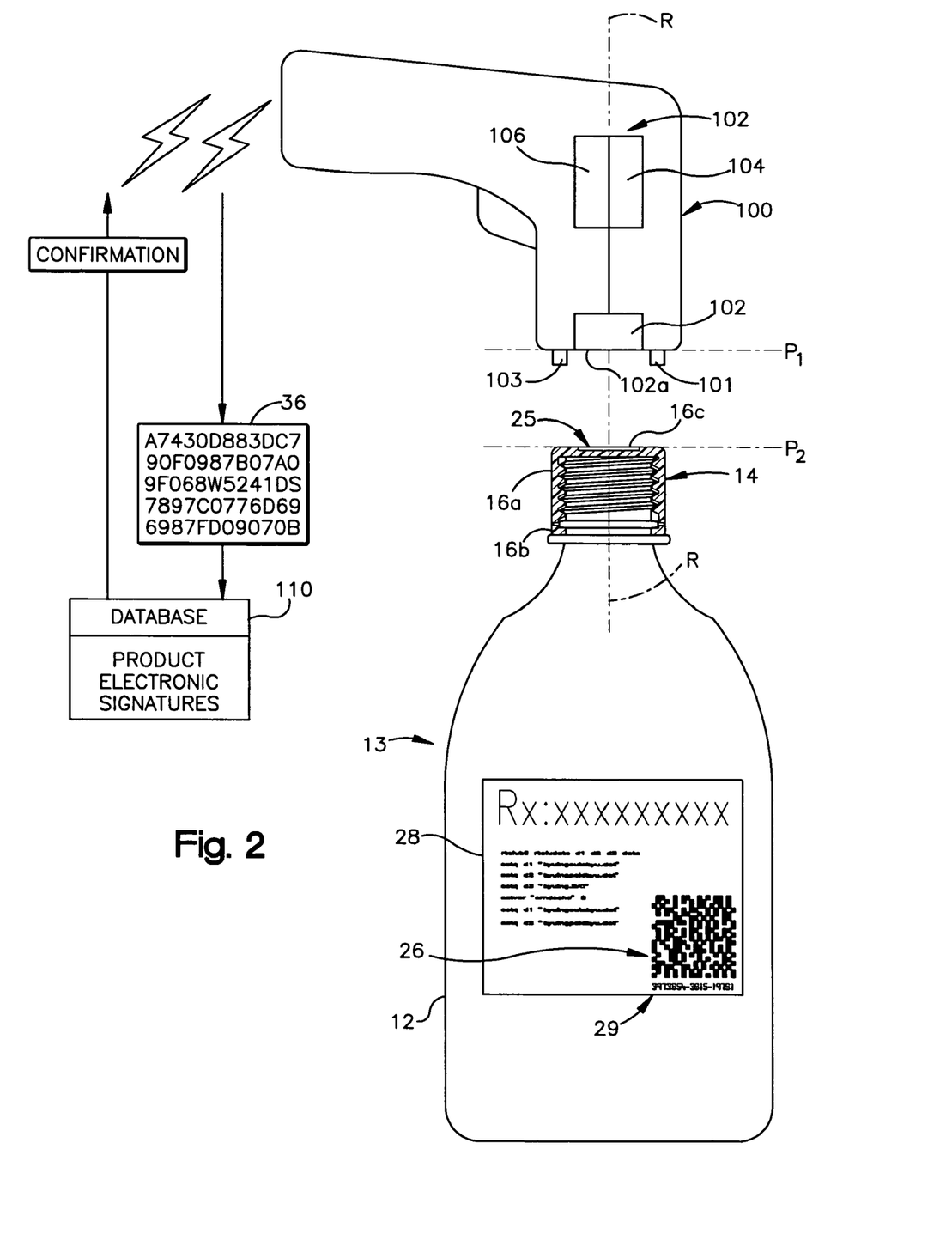
FIG. 2 is a schematic representation of the authentication/identification system of the present invention including front elevation view of a container having a tamper-resistant seal including a cap and integral seal ring, the top surface of the cap including a set of identification particles.

One preferred embodiment of the identification or authentication system of the present invention is shown generally at 10 in FIGS. 1 and 2. The system 10 includes a product 13 comprising a container 12 that holds, for example, prescription medication in the form of tablets, capsules or liquid. The product container 12 includes a tamper-resistant seal 14. As shown in FIGS. 1 and 1A, the seal 14 may be a plastic wrap 14a that tightly overlies a cap or top 15 of the container 12 and a shoulder portion 12a of the container below the cap 15. Typically, the seal wrap 14a includes one or more vertical lines of weakness 14b that allow a consumer to more easily remove the wrap from container 12.

Alternately, as shown in FIG. 2, the seal 14 may be a combination of a threaded plastic cap 16a with an integral tamper ring 16b. In either form, to access the product 13 in the container 12, the consumer must break the seal 14, effectively destroying it. In the case of the wrap seal, the consumer must tear or cut the seal before opening the cap or top. In the case of the threaded plastic cap with tamper ring, the consumer must unscrew the cap to access the product. Removing the cap permanently breaks the cap from the integral seal ring. The shape of the container adjacent the seal ring permanently retains the seal ring on the container thereby preventing its removal.

Embedded in the seal 14 is a unique identification pattern 20 comprising a plurality of spaced apart identification particles 22 within an area or region of interest 25 of the seal 14. To facilitate reading the identification pattern 20, the region of interest 25, that is, the portion of the seal 14 where the pattern 20 is to be imaged may be marked with a border 24 to define the region of interest 25 (FIG. 1A). Alternately, the region of interest 25 may be an unmarked, discrete portion of the seal 14 which facilitates imaging. For example, in the case of the cap 16a with the integral seal ring 16b (FIG. 2), a top surface of the cap 16c may define the region of interest 25 without the need for a marked border.

The particles 22 preferably are embedded in the substrate of the seal 14, that is, the material that the seal 14 is fabricated from. For example, if the seal 14 is a shrink wrap plastic film 14a (FIG. 1) or a cap and seal ring combination 16a, 16b, identification particles may be mixed in with the plastic raw materials during the extrusion process. In this manner, the identification particles are distributed through and embedded in the substrate comprising the seal 14. Advantageously, by embedding the identification particles in the seal substrate during the fabrication process, each seal 14 will have a unique distribution of identification particles throughout the seal substrate and, more importantly, each seal 14 will have a unique identification pattern 20 of particles 22 within the region of interest 25.

The identification particles may be comprised of any of a number of different materials so long as the particles can be easily and clearly identified with respect to the substrate material of the seal 14 within the region of interest 25 when the region 25 is imaged by an imaging device 100, as explained below. By way of example and without limitation, the identification particles may be discrete pieces of material that fluoresce under UV or other specific wavelengths of illumination. The particles 22 may also be discrete pieces of metal such as small metal chips or shavings. The particles 22 may be small pieces of fabric or other material that changes color under illumination of specific wavelength. Alternately, the particles 22 may be discrete markings that are printed, etched or otherwise impressed on the seal 14 within the region of interest area 25.

The identification and authentication system 10 further includes the imaging device 100, such as an imaging-based bar code reader or scanner. The device 100 is used to image the identification pattern 20 found within the region of interest 25, that is, within the border 24. Generally, imaging-based bar code readers or scanners utilize imaging arrays such as CCD arrays or CMOS arrays having a plurality of photosensitive elements or pixels. Light reflected from a target image, e.g., a target bar code imprinted on a product label or product packaging, is focused through a lens of the imaging system onto the pixel array. Output signals from the pixels of the pixel array are digitized by an analog-to-digital converter. Decoding circuitry of the imaging system processes the digitized signals and attempts to decode the imaged target, e.g., the imaged target bar code.

As noted above, the particles 22 of the pattern 20 may be comprised of visible particles embedded in or imprinted on the seal 14 or, alternately, may be comprised of non-visible particles embedded in or imprinted on the seal 14 that may be imaged only when exposed to illumination having proper wavelengths. If the pattern 20 is comprised of non-visible particles, the reader 100 will necessarily include an illumination source 101 generating a proper wavelength illumination for imaging the particles 22 such that the particles may be discerned by an imaging system 102 of the reader. The reader 100 may also include a second illumination source 103 generating targeting illumination pattern to aid a user of the reader in aiming the reader at the border 24.

As will be explained below, advantageously, the system 10 permits any rotational angular orientation between the reader 100 and the region of interest 25, that is, the reader 100 may be used to read the identification pattern 20 regardless of the rotational angle of the reader 100 with respect to the axis R—R in FIG. 2. However, the reader 100 should be aligned with the region of interest 25 such that a front lens 102a of the imaging system 102 is aligned with and substantially parallel to the region of interest 25 so as to avoid error associated with a skewed image of the region of interest 25. That is, a line P1 along a front lens 102a of the imaging assembly 102 should be parallel to a line P2 along a surface of the region of interest 25 and the imaging assembly should be aligned with the region of interest 25 as shown in FIG. 2.

Utilizing its imaging system 102 and bar code decoding circuitry 104, the reader 100 may be used both to image and decode a bar code 26 imprinted on a label 28 of the container 12 to obtain certain information and for inventory control purposes and then to identify/authenticate the product 13 as described below. For the decoding of the identification pattern 20, the reader 100 includes additional identification decoding circuitry 106, embodied either in software or hardware, such that when the seal 14 is imaged by the reader 100, the identification decoding circuitry 106 analyzes the captured image, identifies the region of interest 25 and the identification particles 22 within it, ascertains the identification pattern 20 and determines an electronic signature 36 for the product 13.

As will be explained below, the product bar code 26 may also advantageously include a coded version 29 of the electronic signature 36 of the product 13. This facilitates identification/authentication of the product 13 without the need for transmission of the identification pattern electronic signature 36 to a database for authentication because the identification pattern electronic signature 36 may be compared to the decoded bar code electronic signature 29 to authenticate the product 13.

Figure 3A:
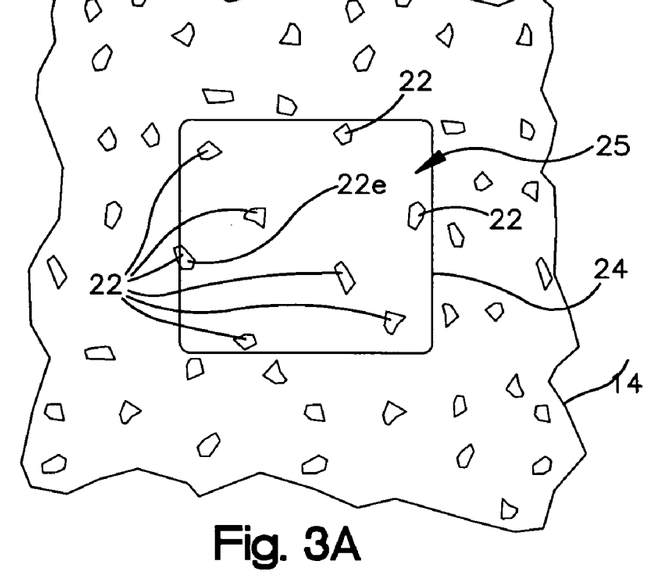
FIGS. 3A–3D are schematic diagram depicting selected steps of a process implementing the authentication/identification system of the present invention.
Figure 3B:
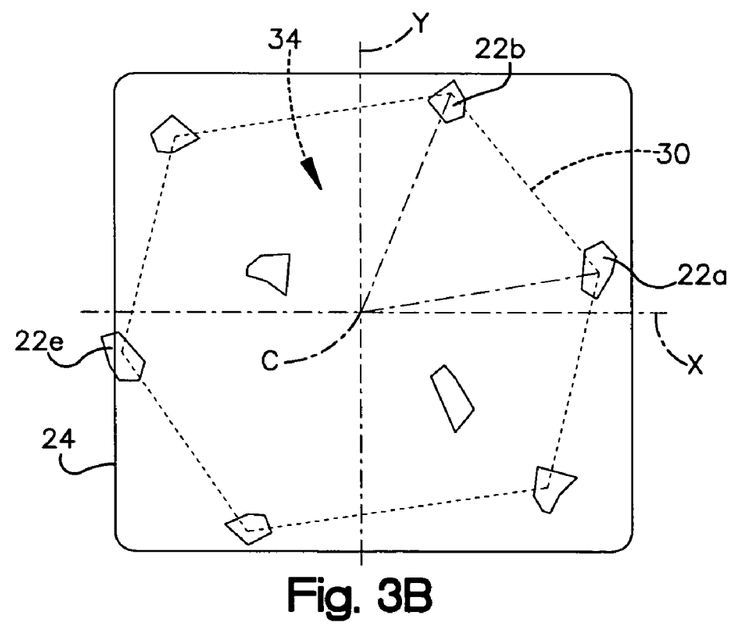
Figure 3C:
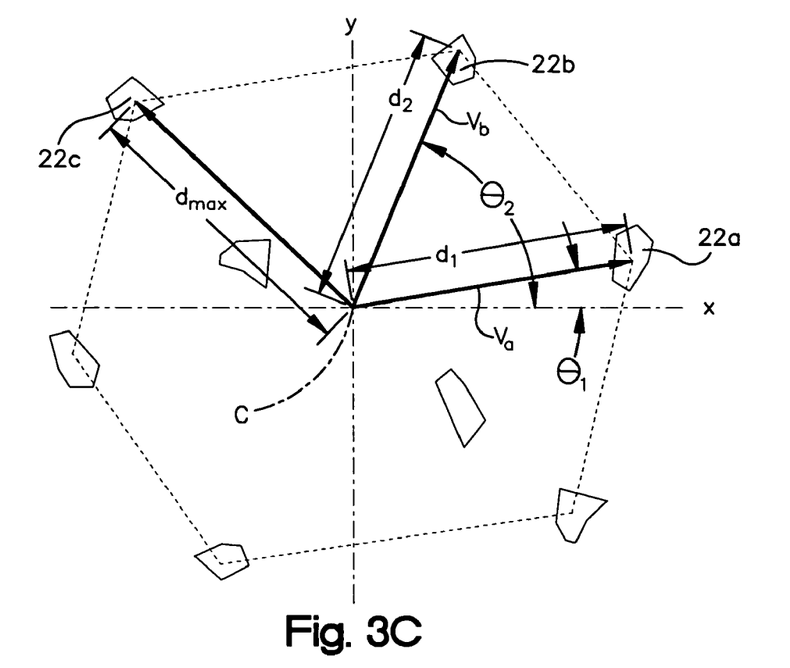
Figure 3D:
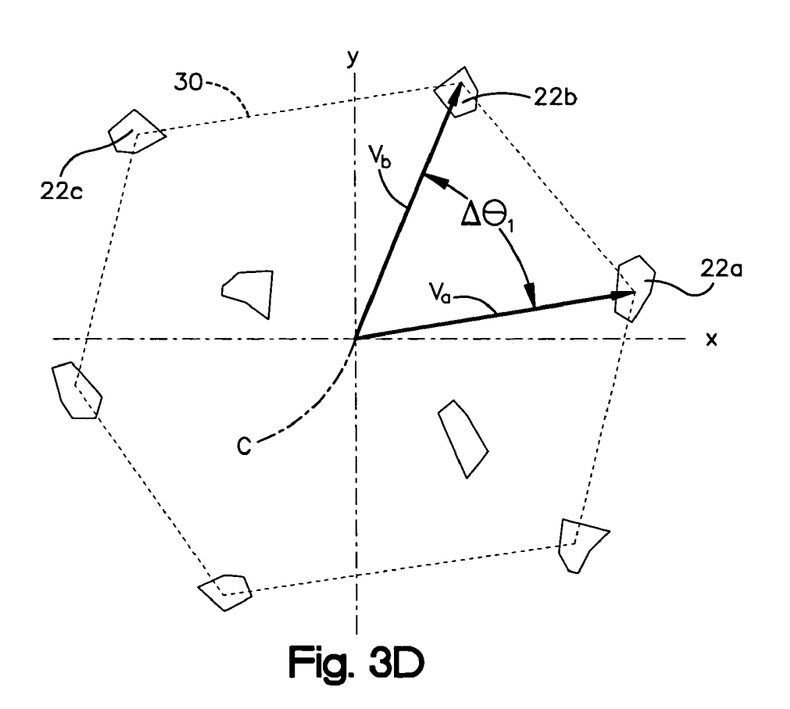
Figure 4:
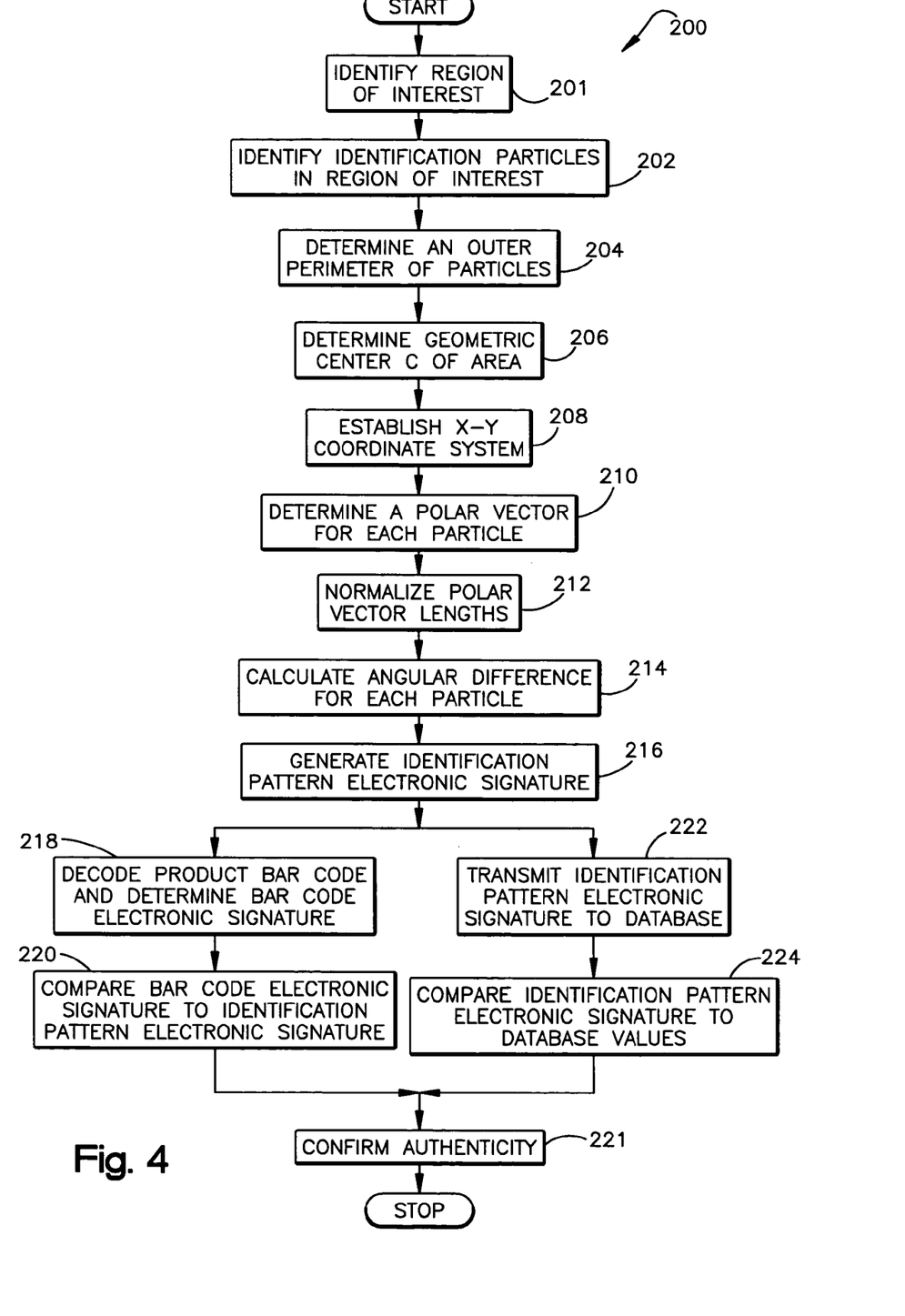
FIG. 4 is a flow chart depicting selected steps of the authentication/identification process.

A process or method used by the identification decoding circuitry 106 is shown schematically in FIGS. 3A–3D and generally at 200 in the flow chart of FIG. 4. First, at step 201, the identification decoding circuitry 106 analyzes the image captured by the imaging system 102 and identifies the region of interest 25. If there is a marked border 24, the region of interest 25 will be an area within the border. If there is no marked border, then the region of interest will have to be some discrete area of the seal 14 that the user can readily identify and image, e.g., the upper surface 16c of the cap 16a. The circuitry 106 confines further analysis to the region of interest 25. FIG. 3A shows the border 25, the region of interest 25 and the identification particles 22 within the region of interest 25.

Next, at step 202, the decoding circuitry 106 identifies the particles 22 within the border 24 and filters out any other non identification particle related marks in the image. For example, particles of dust or other containments that may be disposed within the region of interest 25 are determined by the circuitry 106 not to be identification particles and are subsequently ignored. Similarly, any extraneous markings, such as pen or pencil markings would be filtered out by the circuitry 106. An identification particle that is partially in and out of the region of interest 25, for example, particle 22e, will be considered as an identification particle within the region of interest 25.

At step 204, the identification decoding circuitry 106 determines an outer perimeter 30 defined by the particles 22 within the region of interest 25. This is shown in FIG. 3B. At step 206, the circuitry 106 determines a geometric center C of the area 34 within the perimeter 30.

Next, at step 208, the identification decoding circuitry 106 establishes a Cartesian (x-y) coordinate system with its origin at the center C of the area 34. This is also shown in FIG. 3B. At step 210, the circuitry 106 determines a polar vector V (d, θ) for each particle 22. For example, particle 22a is associated with a polar vector Va having a length or distance $d_1$ measured from the center C and an angle $\theta_1$, measured counterclockwise with respect to the positive x axis. Similarly, particle 22b is associated with a polar vector Vb having a length $d_2$ and an angle $\theta_2$, measured counterclockwise with respect to the positive x axis. This is shown in FIG. 3C.

At step 212, for each of the particles 22, the identification decoding circuitry 106 scales or normalizes the polar vector length d of the particle by dividing the length d by the largest magnitude value of d of all of the particles 22, that is, the value of the maximum length $d_{max}$. In the example, of the particles 11, polar vector Ve has the maximum length $d_{max}$, thus, Vc would have a normalized length of Vc=1 while each of the other polar vectors would have a normalized length less than one. For example, the normalized length of particle 22a would be $d_{1norm}=d_1/d_{max}$.

At step 214, for each particle 22, the identification decoding circuitry 106 calculates a difference between the polar angle of the particle and the polar angle of the next radially adjacent particle when moving or sweeping in a counter-clockwise direction about the center C. For example, for particle 22a, the angular difference, $\Delta_{\theta 1}$, would be the difference between $\theta_2$ and $\theta_1$: $\Delta_{\theta 1}=\theta_2-\theta_1$. This is shown in FIG. 3D. Thus, for each particle 22 within the region of interest 25, associated therewith is a normalized length and an angular difference. For example, for particle 22a, the normalized length is $d_{1norm}$ and the angular difference is $\Delta_{\theta 1}$.

At step 216, the identification decoding circuitry 106, using a hashing algorithm, converts the series of normalized lengths and the angular differences for each of the plurality of particles 22 into an identification pattern electronic signature 36 (shown in FIGS. 1 and 2) for the container 12. The electronic signature 36 is a unique string of characters which functions as an identifier for the container 12 and the product 13 in the container.

There are two ways of using the electronic signature 36 to authenticate the product 13. If the product 13 includes a coded version 29 of the same electronic signature 29 incorporated into, for example, the product bar code 26 printed on the product label 28, the identification pattern electronic signature 36 may be compared with the decoded bar code electronic signature 29 to authenticate the product 13 without the need to transmit the electronic signature 36 or to access the central database 110. If the identification pattern electronic signature 36 matches the product bar code electronic signature 29, the product 13 is authentic. Advantageously, the bar code 26 is a 2D bard code and the electronic signature 29 encoded in the bar code 26 is encoded with a encryption algorithm (e.g., one way hash) so that only the product's manufacturer can create the electronic signature 29.

Alternately or in addition, the identification pattern electronic signature 36 may be compared with a file of electronic signatures stored in the central database 110 to authenticate the product 13. If the identification pattern signature 36 matches one of the stored signatures in the database 110, the product 13 is authentic. It should be recognized that for even a higher level of security both methods may be employed, that is, the bar code electronic signature 29 must match the identification pattern electronic signature 36 and both must match an electronic signature in the database 110 for the product 13 to be deemed authentic.

At step 218, the first method is used, namely, the reader 100 decodes the product bar code 16 on the label 28. In addition to other product-related information, the bar code 26 includes the coded version 29 of the product electronic signature, which is decoded by the reader bar code decoding circuitry 104. At step 220, the identification pattern electronic signature 36 is compared to bar code electronic signature 29 by reader comparison circuitry 108 to authenticate the product 13. At step 221, if the product 13 is determined to be authentic, the comparison circuitry will notify the user by, for example, actuating a speaker on the reader 100 and/or energizing an LED to indicate authenticity. As would be apparent to those of skill in the art, other methods of incorporating or attaching a second electronic signature onto the product 13, other than through use of the bar code 26, are possible. For example, an RFID tag affixed to the product 13 may include an electronic coded version of the product's electronic signature. If the 2D bar code 26 was read by a bar code reader whose bar code decoding circuitry did not have the capability of reading the bar code electronic signature 29, the reader could still decode the product-related information in the bar code 26 but would be unable to decode the bar code electronic signature 29.

Alternately or in addition to the foregoing, the second method is shown at steps 222 and 224. At step 222, the identification pattern electronic signature 36 is transmitted to the central database 110. At step 224, the identification pattern electronic signature 36 is compared to a database listing of electronic signatures for authentic products. It is presumed, of course, that the identification pattern electronic signature 36 was determined and stored in the database 110 by the manufacturer when the product 13 was introduced into the container 12 and the seal 14 was applied to the container 12. If a successful match of the signature 36 is made with a database signature and the tamper-resistant seal 14 is intact, the product 13 is confirmed as authentic and, at step 221, a transmission is sent back to the reader 100 from the database 110 to confirm authenticity to the user of the reader 100. For example, a speaker on the reader 100 may emits a distinctive beep or an LED may be actuated to indicate authenticity.

The two methods of authentication each have advantages. The first method has the advantage of not requiring communications with the central database 110 and, therefore, "stand alone" authentication can be done in the field without the need for a central database.

The second method of authentication advantageously permits trace and track of the product 13 through its distribution system. The transmission of the electronic signature of the container 12 to the central database 110 may also include additional information such as the time and place that the reading of the identification pattern 20 occurred, an identification number of the reader device 100, an identification number of the user/company authorized to use the reader device 100. This information permits tracking of the container 12 and, therefore, the product 13 as it moves through its distribution system from manufacturer to consumer.

Advantageously, because the container's identification pattern electronic signature 36 is based on normalized polar vector lengths, the identification/authentication method described above may be successfully utilized regardless of the distance between the reader device 100 and the tamper-resistant seal 14 or the degree of magnification used in the optics of the reader device 100 so long as the border area 25 is successfully imaged and the particles 22 identified.

Further, since the container's electronic signature 36 is based on angular differences between the particles 22, the identification method described above may be successfully executed regardless of the relative angle of rotation between the reader device 100 and the seal 14 with respect to axis R—R (FIG. 2), that is, the rotational orientation of the identification pattern 20 when being imaged by the imaging system 102 is of no consequence since the perimeter 30, the center point C and the angular differences $\Delta\theta$ between the identification particles 22 within the region of interest 25 will be the same regardless of how the container and seal are rotated with respect to the imaging system 102. Of course, it is important that the reader 100 is aligned with the region is interest 25 such that the region 25 is substantially parallel to the reader imaging system 102. FIG. 2 shows the necessary alignment as the region of interest 25 is the upper surface 16c of the cap 16a, that is, lines P1 and P2 are parallel. Yet another advantage of the identification system of the present invention is that the seal 14 is effectively destroyed when a consumer opens the container 12 thereby making it impossible to reuse the seal in conjunction with counterfeit product.

While the present invention has been described with a degree of particularity, it is the intent that the invention includes all modifications and alterations from the disclosed design falling with the spirit or scope of the appended claims.

We claim:

1. A method for authenticating an object, the steps of the method comprising:
    providing a substrate coupled to the product that includes identification particles;
    imaging a region of interest of the substrate to identify identification particles;
    for identified identification particles in the region of interest, calculating a mathematical value representative of a position of the particle relative to at least one other identification particle;
    converting the mathematical values of the identified identification particles into an identification value representative of the identified identification particles; and
    comparing the identification value with a second identification value to authenticate the object.

2. The method of authenticating an object set forth in claim 1 wherein the imaging of the substrate is done by a bar code reader.

3. The method of authenticating an object set forth in claim 1 wherein the step of calculating a mathematical value representative of a position of the particle relative to at least one other identification particle includes the substep of determining outer perimeter of the identification particles within the region of interest.

4. The method of authenticating an object set forth in claim 3 wherein part (c) further includes the substep identifying a geometric center of an area enclosed by the outer perimeter.

5. The method of authenticating an object set forth in claim 1 wherein calculation of a mathematical value representative of a position of the particle relative to at least one other identification particle recited in part (c) includes a value representative of an angular difference between the particle and an adjacent identification particle relative to a reference point.

6. The method of authenticating an object set forth in claim 5 wherein the reference point is a geometric center of an area enclosed by an outer perimeter of the identification particles within the region of interest.

7. The method of authenticating an object set forth in claim 6 wherein calculation of a mathematical value representative of a position of the particle relative to at least one other identification particle recited in part (c) includes a value representative of a vector distance between the particle and the reference point.

8. The method of authenticating an object set forth in claim 7 wherein the vector value representative of a distance between the particle and the reference point is normalized based on the largest magnitude vector value of the subset of identification values.

9. The method of authenticating an object set forth in claim 1 wherein the identification value is an electronic signature of the object.

10. The method of authenticating an object set forth in claim 1 wherein the object is a product container and the substrate is a tamper-resistant seal attached to the product which is destroyed upon opening the container.

11. The method of authenticating an object set forth in claim 10 wherein the seal is a wrap overlying a cap and a portion of the container adjacent the cap.

12. The method of authenticating an object set forth in claim 10 wherein the seal is a cap and integral seal ring attached to the cap, the seal ring engaging the container such that the seal ring remains permanently attached to the container when the cap is removed breaking the engagement of the cap and the seal ring.

13. The method of authenticating an object set forth in claim 1 wherein the identification particles are embedded in the substrate.

14. The method of authenticating an object set forth in claim 13 wherein the identification particles comprise metal particles.

15. The method of authenticating an object set forth in claim 13 wherein the identification particles comprise particles that are imagable only when illuminated with illumination of a predetermined wavelength range.

16. The method of authenticating an object set forth in claim 15 wherein the particles are imagable only when illuminated by illumination in the UV spectrum.

17. The method of authenticating an object set forth in claim 1 wherein the identification particles are imprinted on the substrate.

18. The method of authenticating an object set forth in claim 1 wherein the identification value is transmitted to a database and the second identification value is stored in the database, the second identification value being identical to the identification value.

19. The method of authenticating an object set forth in claim 18 wherein the second identification value is coupled to the object.

20. A method of tracking a product as it moves through a distribution system, the steps of the method comprising:
providing a substrate coupled to the product that includes a group of identification particles;
imaging a region of interest of the substrate and identifying identification particles within the region of interest;
for each of the identified identification particles within the region of interest, calculating a mathematical value representative of a position of the particle relative to at least one other identification particle;
converting the mathematical values of the identified identification particles into an identification value representative of the identified identification particles; and
sending the identification value to a database so the product may be tracked.

21. The method of tracking a product set forth in claim 20 wherein information regarding a location and a time of the imaging and an identification of a device performing the imaging is transmitted to the database in addition to the identification value of the product.

22. The method of tracking a product set forth in claim 20 wherein the imaging of the substrate is done by a bar code reader.

23. The method of tracking a product set forth in claim 20 wherein The method of identifying an object set forth in claim 1 wherein the imaging of the substrate is done by a bar code reader.

24. The method of tracking a product set forth in claim 20 wherein part (c) includes the substep of determining outer perimeter of the identification particles within the region of interest.

25. The method of tracking a product set forth in claim 24 wherein part (c) further includes the substep identifying a geometric center of an area enclosed by the outer perimeter.

26. The method of tracking a product set forth in claim 24 wherein calculation of a mathematical value representative of a position of the particle relative to at least one other identification particle recited in part (c) includes a value representative of an angular difference between the particle and an adjacent identification particle relative to a reference point.

27. The method of tracking a product set forth in claim 26 wherein the reference point is a geometric center of an area enclosed by an outer perimeter of the identification particles within the region of interest.

28. The method of tracking a product set forth in claim 27 wherein calculation of a mathematical value representative of a position of the particle relative to at least one other identification particle recited in part (c) includes a value representative of a vector distance between the particle and the reference point.

29. The method of tracking a product set forth in claim 28 wherein the vector value representative of a distance between the particle and the reference point is normalized based on the largest magnitude vector value of the subset of identification values.

30. The method of tracking a product set forth in claim 20 wherein the identification value is an electronic signature of the object.

31. The method of tracking a product set forth in claim 20 wherein the substrate is a tamper-resistant seal attached to the product which is destroyed upon opening the product.

32. The method of tracking a product of claim 31 wherein the seal is a wrap overlying a cap of a container associated with the product and a portion of the container adjacent the cap.

33. The method of tracking a product of claim 31 wherein the seal is a cap of a container associated with the product and an integral seal ring attached to the cap, the seal ring engaging the container such that the seal ring remains permanently attached to the container when the cap is removed breaking the engagement of the cap and the seal ring.

34. The method of tracking a product of claim 20 wherein the identification particles are embedded in the substrate.

35. The method of tracking a product of claim 34 wherein the identification particles comprise metal particles.

36. The method of tracking a product of claim 34 wherein the identification particles comprise particles that are imagable only when illuminated with illumination of a predetermined wavelength range.

37. The method of tracking a product of claim 36 wherein the particles are imagable only when illuminated by illumination in the UV spectrum.

38. The method of tracking a product of claim 20 wherein the identification particles are imprinted on the substrate.

39. A system for authenticating a product comprising:
a product including a substrate coupled to the product that includes an identification pattern in a region of interest, the identification pattern including identification particles;
an imaging device including an imaging system for generating an image of the substrate region of interest; and
the imaging device further including circuitry for:
analyzing the image of the substrate region of interest to identify identification particles within the region of interest;
for identified identification particles in the region of interest, calculating a mathematical value representative of a position of the particle relative to at least one other identification particle;
converting the mathematical values of the identified identification particles into an identification value representative of the identified identification particles; and
comparing the identification value with a second identification value to authenticate the product.

40. A system for identifying a product comprising:
a product including a substrate coupled to the product that includes an identification pattern in a region of interest, the identification pattern including identification particles;
an imaging device including an imaging system for generating an image of the substrate region of interest; and
the imaging device further including circuitry for:
analyzing the image of the substrate region of interest to identify identification particles within the region of interest;
for identified identification particles in the region of interest, calculating a mathematical value representative of a position of the particle relative to at least one other identification particle.

* * * * *